(12) United States Patent
Olin (10) Patent No.: US 6,559,864 B1
(45) Date of Patent: May 6, 2003

(54) METHOD AND SYSTEM FOR DISPLAYING AND PROVIDING ACCESS TO DATA ON A MONITOR

(75) Inventor: Gregg R. Olin, Fairport, NY (US)

(73) Assignee: X-Net Associates, Inc., Fairport, NY (US)

( * ) Notice: Subject to any disclaimer, the term of this patent is extended or adjusted under 35 U.S.C. 154(b) by 0 days.

(21) Appl. No.: 09/443,670

(22) Filed: Nov. 19, 1999

Related U.S. Application Data (60) Provisional application No. 60/109,049, filed on Nov. 19, 1998.

(51) Int. Cl.[7] .................................................. G06F 17/21
(52) U.S. Cl. ....................................... 345/762; 702/513
(58) Field of Search ................................ 345/762, 765, 345/797, 804, 808; 707/201, 200, 101, 102, 513

(56) References Cited

U.S. PATENT DOCUMENTS

| | | |
|---|---|---|
| 5,226,117 A | 7/1993 | Miklos |
| 5,237,651 A | 8/1993 | Randall |
| 5,784,061 A | 7/1998 | Moran et al. |
| 5,828,376 A | 10/1998 | Solimene et al. |
| 5,870,552 A * | 2/1999 | Dozier et al. ................ 707/501 |
| 6,189,019 B1 * | 2/2001 | Blumer et al. ............... 707/513 |
| 6,212,530 B1 * | 4/2001 | Kadlec ........................ 707/201 |

* cited by examiner

*Primary Examiner*—Cao H. Nguyen
(74) *Attorney, Agent, or Firm*—Nixon Peabody LLP (57) ABSTRACT

A method and system for displaying and providing access to data on a monitor includes retrieving at least two vistas from a memory, preparing the vistas for display, and then displaying the retrieved vistas in one of at least three different formats on the monitor. Each of the vistas comprises at least one panel of data for display. The three formats comprise a collapsed state wherein more than one, but less than all of the panels of data for the vista are displayed, an open state wherein a selected set of two or more of the panels of data are displayed for the vista, and an exploded state wherein all of the panels of data are displayed for the vista.

25 Claims, 3 Drawing Sheets

METHOD AND SYSTEM FOR DISPLAYING AND PROVIDING ACCESS TO DATA ON A MONITOR

This application claims the benefit of U.S. Provisional Patent Application Serial No. 60/109,049 filed on Nov. 19, 1998 pending which is herein incorporated by reference.

FIELD OF THE INVENTION

This invention relates a method and system for displaying and providing access to data on a monitor.

BACKGROUND OF THE INVENTION

Typically, a processing system comprises either a single work station with a processor, memory, monitor, and keyboard and/or computer mouse coupled together or a plurality of these types of work stations coupled by a network to one or more servers. In either case, when an operator wants to begin to process data, an application is executed in the processing system. The executed application will usually require a variety of different sets or groups of data elements to be retrieved and displayed on the monitor at the work station. Unfortunately, in these prior processing systems the retrieval, display, and access of these sets of data elements from a memory onto a monitor at the work station has been a difficult, time consuming, and inefficient.

By way of example, a lender may execute an application in a processing system to process a consumer loan for an automobile or a mortgage. To process the consumer loan, the lender needs access to a variety of different sets of data, such as the applicant's address, sources of income, outstanding loans, credit report, the collateral for the loan, etc. With prior systems, the lender would need to input a separate request into the processing system to retrieve each of these necessary sets of data elements, e.g. one request for the applicant's address, another request for the applicant's sources of income, etc. As a result, this process of retrieving the data is very tedious, time consuming, and inefficient.

Additionally, to process the loan the lender typically needs to view differing amounts of the data in each of the data sets. For example, the lender may only need to see some of the applicant's personal data in the set of data with the applicant's address, but may need to see all of the data in applicant's credit report. With prior systems, the lender can either see all of the data in a data set or none of it. As a result, to review any data the lender must pull up all of the data in a set and review or scroll through a substantial amount of unnecessary data to view the necessary data to process the loan. This makes the process of viewing the data in the sets of data on the monitor tedious, time consuming, and inefficient. It also makes it difficult to move between different sets of data rapidly.

SUMMARY OF THE INVENTION

A method for displaying and providing access to data on a monitor in accordance with one embodiment of the present invention includes a few steps. First. at least two vistas are retrieved from a memory. Each of the vistas comprises at least one panel of data for display. Next, the vistas are prepared for display and then the retrieved and prepared vistas are displayed in one of at least three different formats on the monitor. The three formats comprise a collapsed state wherein one of the panels of data for the vista is displayed, an open state wherein more than one, but less than all of the panels of data are displayed for the vista, and an exploded state wherein all of the panels of data are displayed for the vista.

A computer readable medium in accordance with another embodiment of the present invention includes has stored thereon instructions which, when executed by a processor, cause the processor to retrieve at least two vistas from a memory, prepare the vistas for display, and then cause the retrieved and prepared vistas to be displayed on a monitor in one of at least three different formats. Each of the vistas comprises at least one panel of data for display. The three formats comprise a collapsed state wherein one of the panels of data for the vista is displayed, an open state wherein more than one, but less than all of the panels of data are displayed for the vista, and an exploded state wherein all of the panels of data are displayed for the vista.

A system for displaying and providing access to data in accordance with yet another embodiment of the present invention includes a memory, a processor and a monitor. The memory is configured to store at least two vistas, each of the vistas comprising at least one panel of the data for display. The processor is configured to retrieve at least two vistas from the memory in response to a request and to prepare the vistas for display. The monitor is configured to display the retrieved and prepared vistas from the processor, each of the vistas displayed in one of at least three different formats on the monitor. The three formats comprise a collapsed state wherein one of the panels of data for the vista is displayed, an open state wherein more than one, but less than all of the panels of data are displayed for the vista, and an exploded state wherein all of the panels of data are displayed for the vista.

A processing system for displaying and providing access to data in accordance with yet another embodiment of the present invention includes a first system coupled to a second system. The first system has a first processor coupled to a first memory. The first memory stores at least two vistas, each of the vistas comprising at least one panel of the data for display. The second system has a second processor coupled to a second memory and a monitor. The second processor is configured to retrieve at least two of the vistas from the first memory in a single transaction and to prepare the vistas for display. The monitor is configured to display the retrieved and prepared vistas, each of the vistas displayed in one of at least three different formats on the monitor. The three formats comprise a collapsed state wherein one of the panels of data for the vista is displayed, an open state wherein more than one, but less than all of the panels of data are displayed for the vista, and an exploded state wherein all of the panels of data are displayed for the vista.

With the present invention, sets of data needed during the execution of an application in a processing system can be quickly and easily retrieved. Typically, all of the sets of data can be retrieved in a single transaction. Based upon the request, the system tries to determine all of the vistas that are or may be needed and then retrieves all of these vistas. As a result, the operator of the processing system can more quickly receive and process the necessary data.

Additionally, with the present invention once the sets of data are retrieved, then the operator can easily transfer between the differing sets of data which are displayed on the monitor in one of three different formats. With the collapsed format, the operator is able to view a single panel of data which identifies or provides a title or abstract for the data contained in the set of data or vista. With the open format, the operator can view two or more pre-selected panels of data for the vista. Typically, these panels of data will contain the most important data panels needed for processing so that the operator does not have to review all of the data panels in the vista. With the exploded state, the operator can review all of the panels of data in a vista when necessary. Once an operator is finished with a vista, the operator can simply signal the processing system via an input device to switch the format for a vista to a collapsed state and then can signal the processing system to switch the format of another vista to either an open format or an exploded format as necessary. As a result, an operator of the processing can quickly, easily, and efficiently move between and display data in vistas in different formats.

DETAILED DESCRIPTION

Figure 1:
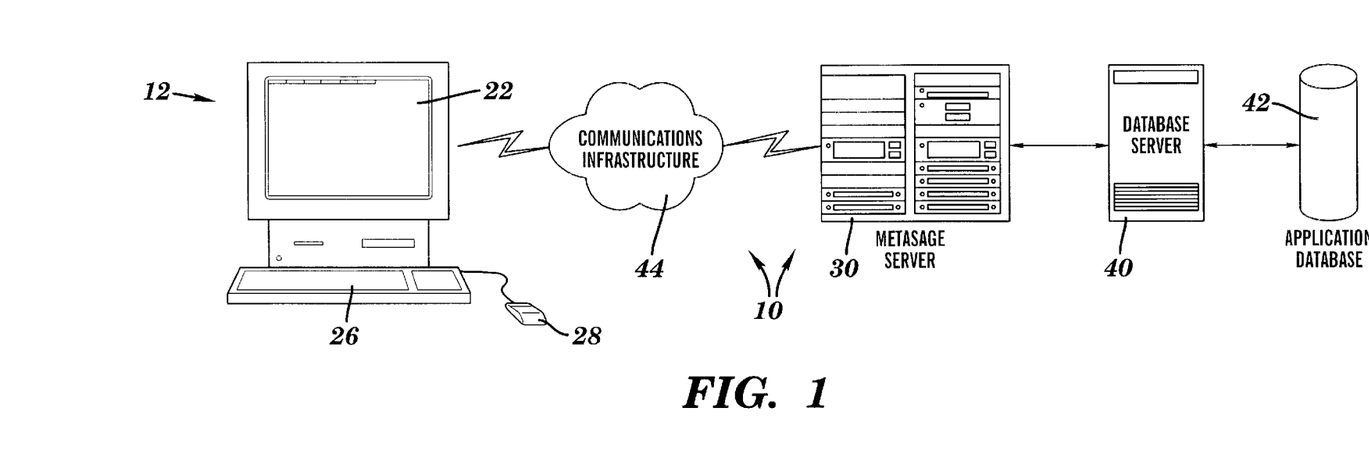
FIG. 1 is a block diagram of a system for displaying and providing access to data on a monitor in accordance with one embodiment of the present invention.

A processing system 10 for displaying and providing access to data in accordance with one embodiment of the present invention is illustrated in FIG. 1. The processing system 10 includes a memory configured to store at least two vistas, a processor 14 configured to retrieve at least two of the vistas from the memory 16, 34, or 42 in response to a request and to prepare the vistas for display, and a monitor 22 configured to display the retrieved and prepared vistas from the processor 14. Each of the vistas is displayed in one of at least three different formats on the monitor 22. The three formats comprise a collapsed state wherein one of the panels of data for the vista is displayed, an open state wherein a selected set of two or more of the panels of data are displayed for the vista, and an exploded state wherein all of the panels of data are displayed for the vista. The present invention provides a number of advantages including providing a user with all of the requested data in a single transaction and with the ability to access and view vistas or sets of data in three different formats and to transfer between different vistas.

Figure 2A:
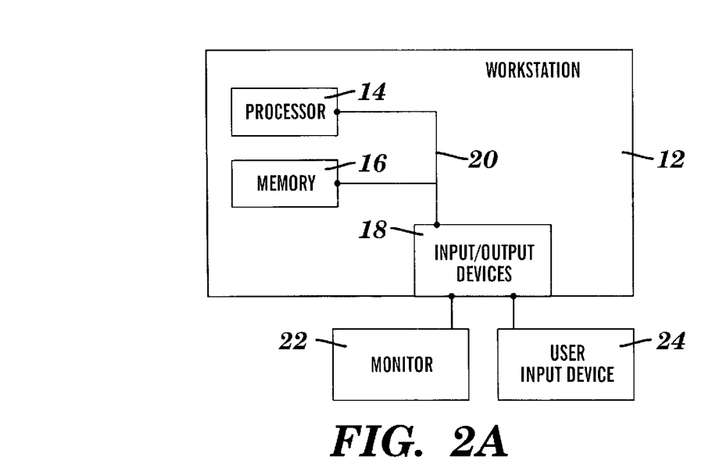
FIG. 2A is a block diagram of a work station with a monitor where vistas are displayed in one of at least three different formats.

Referring to FIGS. 1 and 2A, in this particular embodiment the processing system 10 includes a first work station, a first larger or smaller computer system, or a first general purpose personal computer system 12 programmed with the method for displaying and providing access to data in accordance with the present invention. This first system 12 includes a processor 14, a memory 16, and one or more input/output (I/O) devices 18 which are all coupled together by a bus 20, although the first system 12 can contain multiple processors, memories, and I/O devices as needed or desired. Since the components and general operation of computer systems are well known to those of ordinary skill in the art, they will not be discussed here.

Any type of storage device, such as a RAM or ROM, can be used as the memory 16 in the first system 12. Additionally, the memory 16 may comprise a disk or CD ROM drive that is coupled to the processor 14 and which can receive, read data from, and/or write data to a portable memory device, such as a floppy disk, hard disk, or CD ROM on which the method for displaying and providing access to data in accordance with the present invention is programmed. In this particular embodiment, the method for displaying and providing access to data in accordance with the present invention is stored as an executable program in the memory 16. The program is executed by the processor 14 to impart data retrieval, display, and access functionality in the first system 12. Typically the memory 16 will also store other programs to be executed by the processor 14, such as a loan processing program for handling consumer loans, although other types of programs can be stored. The memory 16, which again may comprise an internal memory structure and/or portable memory device, may also store the vitas or sets of data.

The first system 12 also includes a monitor 22 which is coupled to one of the I/O devices 18. Any type of monitor 22, such as a computer monitor, a television, an LCD, an LED, or any other device which can convey information to a user can be used. The monitor 22 includes a display screen 23 with a plurality of display lines. In this particular embodiment, a display line can display to a user or operator one line of information, such as alpha and/or numeric text. Additionally, in this particular embodiment one panel of data which also comprises information, such as alpha and/or numeric text, can be displayed in each display line. The particular number of display lines in the monitor 22 can vary as needed. The panels of data are transmitted as signals or commands from the first system 12 to the monitor 22 for display. The manner in which the panels of data are processed or prepared by the processor 14 for display and the manner in which each panel of data is displayed in a display line on the monitor 22 is well known to those of ordinary skill in the art and thus will not be described here.

The first system 12 also includes a user input device 24 which is coupled to one of the I/O devices 18. The user input device 24 provides a mechanism for a user or operator of the first system 12 to generate and transmit input signals or commands to the first system 12, such as format changing signals or commands for the displayed vistas or request signals or commands for the retrieval of particular vistas from memory 16 or from other remote storage devices. A variety of different types of user input devices 24 can be used, such as a keyboard 26 or a mouse 28.

Figure 2B:
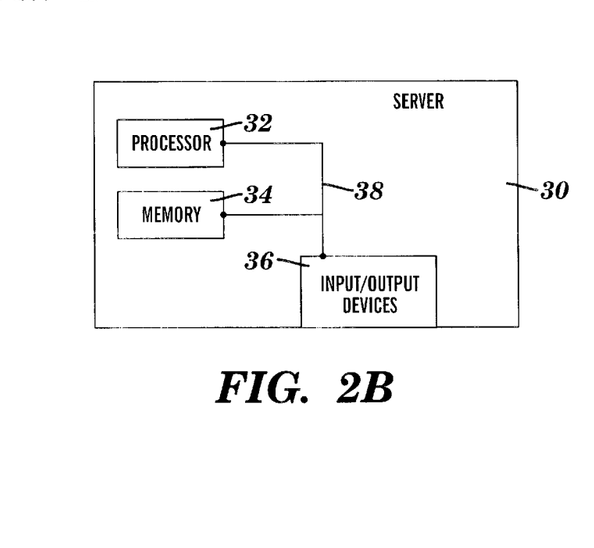
FIG. 2B is a block diagram of a server where the vistas may be stored.

In this particular embodiment, the processing system includes a second system or server 30, although other types of systems, such as a larger or smaller computer system or a general purpose personal computer system, can be used in place of second system 30. Like the first system 12, the second system 30 includes a processor 32, a memory 34, and one or more input/output (I/O) devices 36 which are all coupled together by a bus 38, although the second system 30 can also contain multiple processors, memories, and I/O devices as needed or desired. Since the components and general operation of computer systems are well known to those of ordinary skill in the art, they will not be discussed here.

Again any type of storage device, such as a RAM or ROM, can be used as the memory 34 in the second system 30. Additionally, the memory 34 may comprise a disk or CD ROM drive that is coupled to the processor 32 and which can receive, read data from, and/or write data to a portable memory device, such as a floppy disk, hard disk, or CD ROM on which the method for displaying and providing access to data in accordance with the present invention is programmed. In this particular embodiment, the method for displaying and providing access to data in accordance with the present invention is also stored as an executable program in the memory 34 of the second system 30. The program can be executed by the processor 32 to impart data retrieval, display, and access functionality in the first system 12 in this particular example. The memory 34, which again may comprise an internal memory structure and/or a portable memory device, may also store the vistas or sets of data.

In this particular embodiment, a database server 40 is coupled to an application database 42 and the second system 30. Since the components and general operation a database server 40 are the same as the second system 30 or described above they will not be discussed here. The database server 40 interacts with the application database 42 to retrieve vistas or sets of data for the first and second systems 12 and 30. In this particular embodiment, the second system 30 transmits a request or command for vistas to the database server 40 which then retrieves the vistas from the application database 42. In this particular embodiment, the vistas are stored in the application database 42, although the vistas could be stored in the memory 34 of the second system 30 or the vistas could be stored in the memory 16 of the first system 12 if the first system 12 is operating as an individual processing station. Typically, multiple first systems 12 will be coupled to at least one second system 30.

Each vista or set of data has one or more panels of data. By way of example only, one vista may comprise panels of data regarding a particular applicant's address, another vista may comprise panels of data regarding an applicant's sources of income, another vista may comprise panels of data regarding outstanding loans, another vista may comprise panels of data regarding credit report, the collateral for the loan, etc.

Within each vista, one panel of data receives a first designation indicating that that particular panel of data is designated for display when the vista is in a collapsed format. Additionally, within each vista more than one, but less than all of the panels of data receive a second designation indicating that those particular panels of data are designated for display when the vista is in an open format.

The designations of the first and second panels of data in each vista can be entered into and stored with the vistas in memory 16, 34, or 42 or the designations can be made dynamically when a request for a particular vista is made. If a dynamic designation is to be made, the first or second system 12 or 30 receives the request for a particular vista and determines which panel of data should receive the first designation and which panels of data should receive the second designations in each vista based on the particular request for each vista. The request may includes one or more data fields, such as the identification information of the vista, the identification information about the operator of the first system 12 and/or the particular executable programming being run at the first system 12, which can be used to make the dynamic designation. By way of example only, a request for a vista containing panels of data regarding personal information about an individual, such as the applicant's name, address, age, health status, etc., may also include information that the application being executed at the first system 12 is one for applying for a life insurance policy. As a result, for an application for applying for a life insurance policy the panel of data on the health status in this vista may dynamically be determined to be the most important panel of data and thus would be given the first designation in this example. If another application was being executed and/or other data in the request was different, then a different panel of data in that vista might receive the first designation. In the same manner, the second designations can be made.

The first system 12 is coupled to the second system 30 via a communications infrastructure 44 which transmits commands, vistas, and other data between the first and second systems 12 and 30. A variety of different communication infrastructures 44 can be used, such as a local area network, a wide area network, the world wide web, modems and phone lines, etc. Since the operation of these communication infrastructures are well known to those of ordinary skill in the art they will not be discussed here.

Referring to FIGS. 1–4, the operation of the system 10 in accordance with one embodiment of the present invention will be described. In step 46, the first and second systems 12 and 30 are first initialized. Next in step 48, the execution of the method for displaying and providing access to data in accordance with the present invention stored as an executable program as well as the instructions from another executable program, such as a loan processing program, in the first system 12 begins, although all or part of one or both programs may also be executed in the second system 30.

Figure 4:
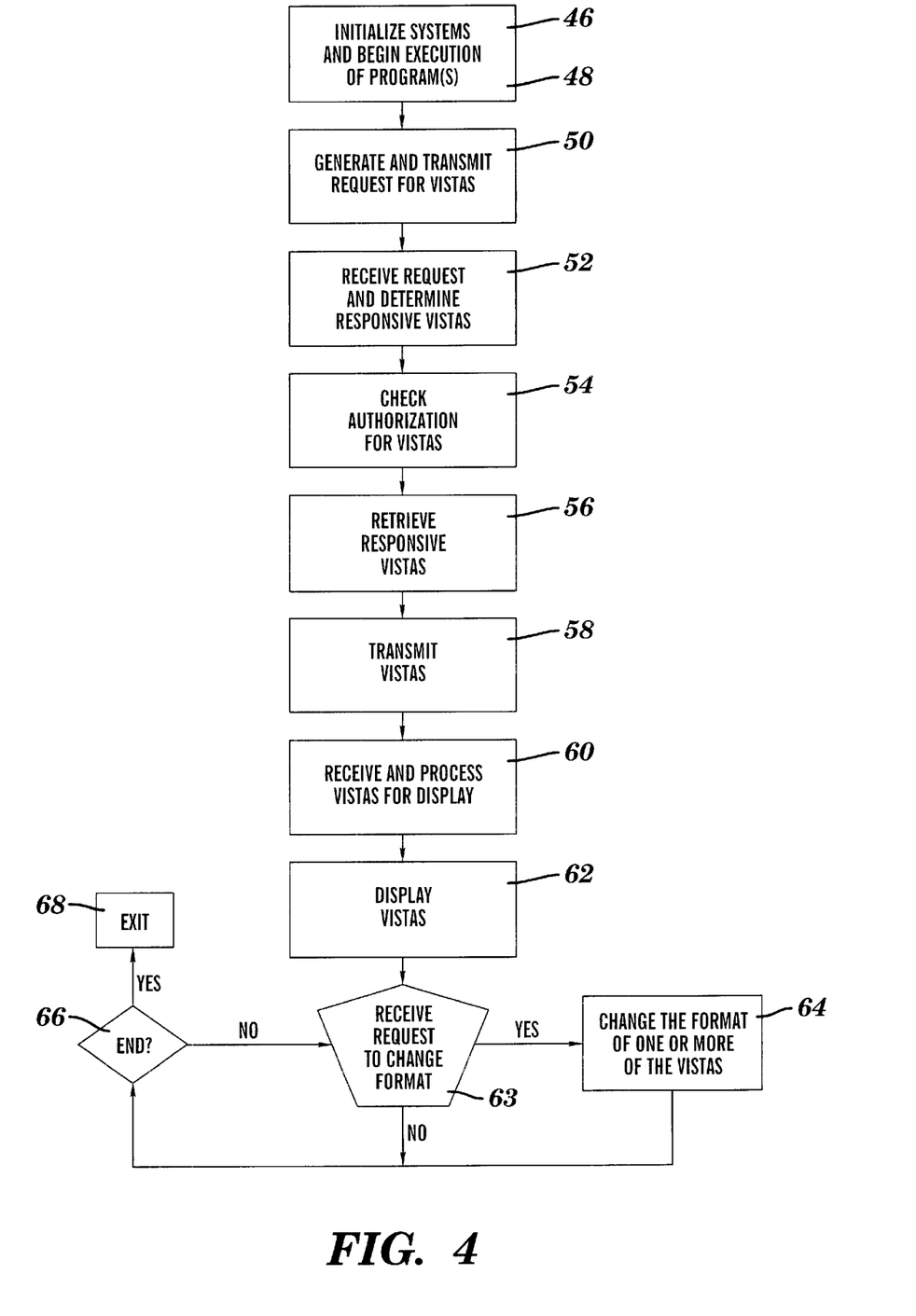
FIG. 4 is a flow chart of a method in accordance with one embodiment of the present invention.

In this particular embodiment, in step 50 the first system 12 generates a first request or command for vistas or sets of data and transmits the first request to the second system 30. The first request may includes one or more data fields, such as the identification information about the operator of the first system 12, the particular executable programming being run at the first system 12, in this example the loan processing application, and a list of desired vistas or sets of data. If in an alternative embodiment the first system 12 is acting as an independent processing system 10 instead of as in a networked configuration as shown in FIG. 1, then the first request would be for vistas stored in memory 16 the first system 12.

In step 52, the second system 30 receives the first request and determines which of the vistas in the memory 34, in this particular embodiment in the application database 42, are responsive to the first request, i.e. all of the possible vistas that may be needed for the particular processing being carried out at the first system 12 so that preferably only one transmission of vistas is required. By way of example only, if the first system 12 is processing a car loan, the second system 30 will select vistas relating to the applicant's address, collateral, outstanding loans, and credit report. Determining and retrieving all of the possible vistas that may be needed at one time, dramatically reduces the number of requests for vistas that must take place between the first and second systems 12 and 30, thus increase the rate of processing which can be accomplished with the first system 12. If in an alternative embodiment, the first system 12 is acting as an independent processing system 10, then the processor 14 determines which of the vistas in memory 16 are responsive to the first request.

In optional step 54, the second system 30 may also determine whether or not the operator of the first system 12 is authorized to retrieve the vistas responsive to the first request. By way of example only, an operator may have access to vistas relating to an applicant's address and loan history, but not to the applicant's financial information or credit report. The second system 30 may also dynamically change which panel of data is designated for the collapsed format and which panels of data are designated for the open format in each vista based on the first request. If in an alternative embodiment, the first system 12 is acting as an independent processing system 10, then the first system 12 may determine whether or not the operator is authorized to retrieve the vistas and/or may dynamically determine the designations of the panel and panels of data for the collapsed and open formats for each vista based on the first request.

In this particular embodiment, once the second system 30 has determined which vistas are responsive and, in this example, authorized for that operator in step 56, the second system 30 retrieves the responsive and authorized vistas from memory 34 or 42. In this particular embodiment, the second system 30, transmits a request to the database server 40 for the desired vistas and the database server 40 retrieves them from the application database 42 and transmits them to the second system 30. If in an alternative embodiment, the first system 12 is acting as an independent processing system 10, then the processor 14 retrieves the responsive and authorized vistas from memory 16.

In step 58, the second system 30 transmits the responsive vista to the first system 12 via the communications infrastructure 44. Typically, this transmission of the requested vistas is accomplished in a single transaction.

In step 60, the first system 12 receives the responsive and authorized vistas from the second system 30 and prepares or processes the vistas for display on the monitor 22. In step 62, the first system 12 transmits the vistas to the monitor 22 for display. If in an alternative embodiment, the first system 12 is acting as an independent processing system 10, then the responsive and authorized vistas are retrieved from memory 16, prepared for display, and transmitted to monitor 22 for display.

The vistas can be displayed in at least three different formats on the monitor 22. In this particular embodiment, the three formats comprise a collapsed format or state wherein one of the panels of data for the vista is displayed, an open format or state wherein more than one, but less than all of the panels of data are displayed for the vista, and an exploded format or state wherein all of the panels of data are displayed for the vista, although the vistas can be displayed in additional formats if desired.

As discussed earlier, within each vista one panel of data receives a first designation indicating that that particular panel of data is designated for display when the vista is in a collapsed format. More than one, but less than all of the panels of data in each vista receive a second designation indicating that those particular panels of data is designated for display when the vista is in an open format. The designations of the first and second panels of data in each vista can be entered into and stored with the vistas in memory or the designations can be made dynamically when a request for a particular vista is made. If a dynamic designation is made, the second system 30 (or the first system 12 if it is working independently) determines which panel of data should receive the first designation and which panels of data should receive the second designations based on the particular request within each vista one vista.

Once the vistas are on display on the monitor 22 in one of three formats, in step 63 the operator can change the format of one or more of the vistas by using an input device 24 to transmit a signal or command to request a change in the format of one or more of the vistas. In this particular embodiment, the change signal from the input device 24 identifies the vista whose format is to be changed and the desired format. If a change is requested in step 63, the Yes branch is taken to step 64 where the change in format for the vista is implemented. Once the change is implemented, then in step 66 a determination is made on whether to end the program. If a determination is made to end the program, then the Yes branch is taken to step 68 where the program exits. If the program is to continue, then the No branch is taken back to step 63. If a change is not requested in step 63, then the No branch is taken to step 66 as described earlier.

Referring to FIGS. 3A–3D, four different examples of how the vistas can be displayed on a display screen 23 of the monitor 22 are illustrated. For purposes of this example only, the display screen 23 has twenty-four display lines, although the number of display lines can vary as needed or desired, and twenty-four vistas have been retrieved for display.

Figure 3A:
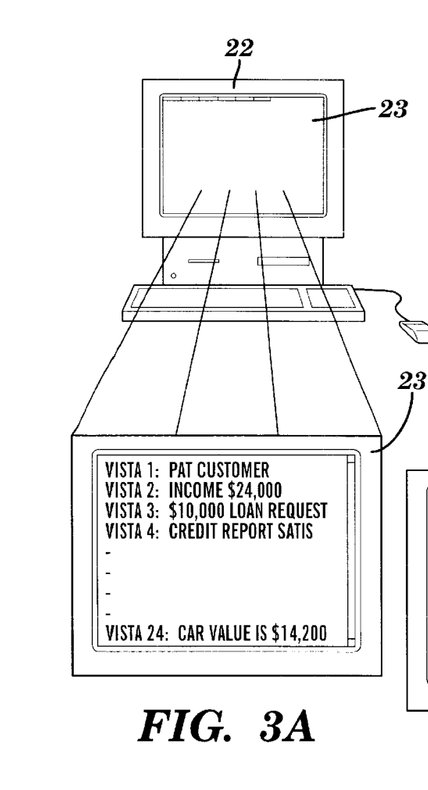
FIGS. 3A–3D are diagrams illustrating different display screens with the vistas in different formats.

In FIG. 3A, all of the vistas are shown in a collapsed format or state so that only one panel of data is illustrated. Since in this particular example there are twenty-four display lines in the display screen 23 of the monitor 22 and twenty-four vistas in a collapsed format, all of the vistas are visible to the operator. The single panel of data shown for each vista provides the operator with a brief abstract or title regarding the contents of that particular vista. From this particular display screen 23, the operator can easily access and switch between the different vistas with ease dramatically reducing the processing time for the particular process being carried out by the operator, such as processing a car loan form.

Figure 3B:
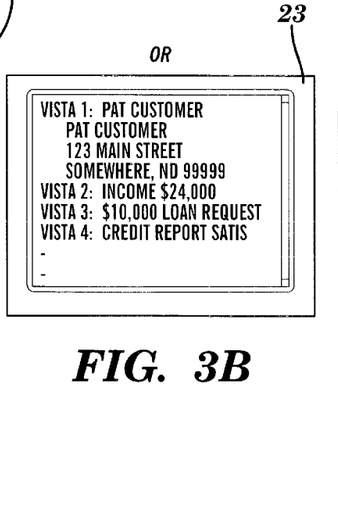

In FIG. 3B, vista one is displayed in an open format with the remaining vistas displayed in a collapsed format. In this particular example, the open format for vista one comprises four panels of data, although the number of panels of data displayed in this format for the vista can vary. In the open format, more than one, but less than all of the panels of data are typically displayed. If a particular vista comprises only one panel of data, the collapsed, open, and exploded format for that vista will appear to be the same. The open format for the vista permits the operator to see the panels of data for that vista that typically are the most important. As a result, the operator does not have to review and scroll through all of the panels of data in a vista to extract the necessary data. Since vista one is in an open state with four panels of data showing in this particular example, all of the remaining twenty-three vistas in a collapsed format are not visible on display screen 23 of the monitor 22. The operator must use the user input device 24 to signal the first system 12 to scroll down to another display screen 23 to view the last three vistas in the collapsed format or other format. Again, the operator can still easily access and switch between the different vistas with ease.

Figure 3C:
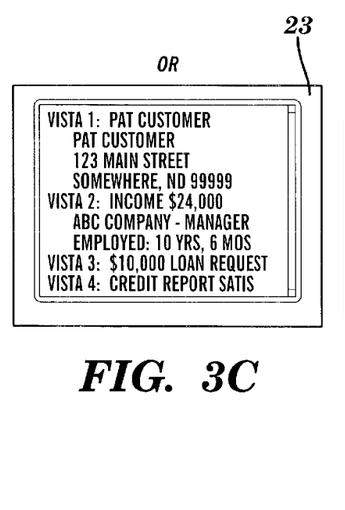

In FIG. 3C, vistas one and two are displayed in an open format with the remaining vistas displayed in a collapsed format. In this particular example, the open format for vista one comprises four panels of data and the open format for vista two comprises three panels of data, although the number of panels of data displayed in this format for each vista can vary. Since vista one is in an open state with four panels of data showing and vista two is in an open state with three panels of data showing in this particular example, all of the remaining twenty-three vistas in a collapsed format are not visible. Again, the operator can use the user input device 24 to signal the first system 12 to scroll down to another display screen 23 to view the last five vistas in the collapsed format or other format. Again, the operator can still easily access and switch between the different vistas with ease and can now see pertinent information in two of the vistas at the same time.

Figure 3D:
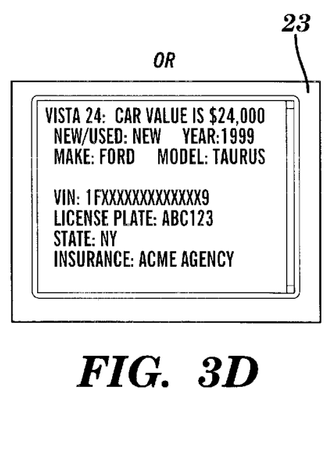

In FIG. 3D, vista twenty-four is displayed in an exploded format so that all of the display lines in the display screen 23 of monitor 22 are filled with panels of data. If the number of panels of data in vista twenty-four exceeds twenty four, then the user can use the user input device 24 to signal the first system 12 to scroll up to another display screen 23 to view the first twenty-three vistas in the collapsed format or other format. In this format, the operator can examine all of the panels of data in detail. For example, if an operator is processing a car loan application at a first system 12, reviews the applicant's credit report from an open format of a vista and has some questions about the applicant's credit history. The operator can open the vista regarding the applicant's credit history to an exploded format and get more panels of data which may answer the operator's question. Once the operator has completed, his/her review of the exploded format, the operator can signal the first system 12 via the user input device 24 to switch the format of the vista from an exploded format to a collapsed format and view other vistas on the display screen 23 of the monitor 22. Again, the operator can still easily access and switch between the different vistas with ease.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for displaying and providing access to data on a monitor, the method comprising:
    retrieving at least two vistas from a memory, wherein each of the vistas represents a portion of a set of information, each vista comprises at least one panel of data for display, each panel of data representing a subset of the portion of the set of information for one of the vistas;
    preparing the retrieved vistas for display; and
    displaying the retrieved vistas in one of at least three different formats on the monitor.

2. The method as set forth in claim 1 wherein the three formats comprise a collapsed state wherein one of the panels of data for the vista is displayed, an open state wherein more than one, but less than all of the panels of data are displayed for the vista, and an exploded state wherein all of the panels of data are displayed for the vista.

3. The method as set forth in claim 2 further comprising:
    designating the panel of data in each of the vistas which is displayed in the collapsed state; and
    designating which of the panels of data in each of the vistas are displayed in the open state.

4. The method as set forth in claim 3 further comprising requesting the retrieval of at least two vistas from memory wherein the designations are made dynamically based on the request.

5. The method as set forth in claim 1 further comprising using an input device to request a change in the format of one or more of the vistas.

6. The method as set forth in claim 1 wherein the monitor has a first number of display lines, wherein one panel of data is located in one of the display lines, the monitor displaying all of the vistas on a single display screen until a cumulative number of the panels of data from the vistas exceeds the first number of display lines, the panels of data which exceed the first number of display lines are configured for display on one or more subsequent display screens on the monitor.

7. The method as set forth in claim 1 wherein retrieving at least two vistas from a memory comprises:
    transmitting a first request for data from a first system to a second system; and
    determining which of the vistas in the memory are responsive to the first request; and
    transmitting all of the responsive vistas from the second system to the first system in a single transaction.

8. The method as set forth in claim 7 further comprising determining if the first request is authorized to retrieve the vistas responsive to the first request, wherein only the responsive and authorized vistas are transmitted from the second system to the first system in the single transaction.

9. A computer readable medium having stored thereon instructions which, when executed by a processor, cause the processor to perform the steps of:
    retrieving at least two vistas from a memory, wherein each of the vistas represents a portion of a set of information, each vista comprises at least one panel of data for display, each panel of data representing a subset of the portion of the set of information for one of the vistas;
    preparing the vistas for display; and
    causing the retrieved and prepared vistas to be displayed on a monitor in one of at least three different formats.

10. The computer readable medium as set forth in claim 9 wherein the three formats comprise a collapsed state wherein one of the panels of data for the vista is displayed, an open state wherein more than one, but less than all of the panels of data are displayed for the vista, and an exploded state wherein all of the panels of data are displayed for the vista.

11. The computer readable medium set forth in claim 9 further comprising changing the format of one or more of the vistas in response to an input request.

12. A system for displaying and providing access to data, the system comprising:
    a memory configured to store at least two vistas, wherein each of the vistas represents a portion of a set of information, each of the vistas comprising at least one panel of the data for display, each panel of data representing a subset of the portion of the set of information for one of the vistas;
    a processor configured to retrieve at least two of the vistas from the memory in response to a request and to prepare the vistas for display; and
    a monitor configured to display the retrieved vistas from the processor, each of the vistas displayed in one of at least three different formats on the monitor.

13. The system as set forth in claim 12 wherein the three formats comprise a collapsed state wherein one of the panels of data for the vista is displayed, an open state wherein more than one, but less than all of the panels of data are displayed for the vista, and an exploded state wherein all of the panels of data are displayed for the vista.

14. The system as set forth in claim 12 further comprising a user input device coupled to the processor, the user input device configured to signal the processor to change the format for one or more of the vistas.

15. The system as set forth in claim 12 wherein the monitor has a first number of display lines, each display line containing one panel of data, the monitor displaying all of the vistas on a single display screen until a cumulative number of the panels of data from the vistas exceeds the first number of display lines, the panels of data which exceed the first number of display lines are configured by the processor for display on one or more subsequent display screens on the monitor.

16. A processing system for displaying and providing access to data, the processing system comprising:
    a first system having a first processor coupled to a first memory, the first memory storing at least two vistas, wherein each of the vistas represents a portion of a set of information, each of the vistas comprising at least one panel of the data for display, each panel of data representing a subset of the portion of the set of information for one of the vistas; and a second system coupled to the first system, the second system having a second processor coupled to a second memory and a monitor, the second processor configured to retrieve at least two of the vistas from the first memory in a single transaction and to prepare the vistas for display, the monitor configured to display the retrieved and prepared vistas, each of the vistas displayed in one of at least three different formats on the monitor.

17. The system as set forth in claim 16 wherein the three formats comprise a collapsed state wherein one of the panels of data for the vista is displayed, an open state wherein more than one, but less than all of the panels of data are displayed for the vista, and an exploded state wherein all of the panels of data are displayed for the vista.

18. The system as set forth in claim 16 further comprising a first input device coupled to the second processor, the first input device configured to signal the second processor to change the format for one or more of the vistas.

19. The system as set forth in claim 16 wherein the monitor has a first number of display lines, each display line containing one panel of data, the monitor displaying all of the vistas on a single display screen until a cumulative number of the panels of data from the vistas exceeds the first number of display lines, the panels of data which exceed the first number of display lines are configured by the processor for display on one or more subsequent display screens on the monitor.

20. The system as set forth in claim 16 wherein the second processor is configured to transmit a first request for data from the second system to the first system and the first processor is configured to determine which of the vistas in the first memory are responsive to the first request and to transmit all of the responsive vistas from the first system to the second system in a single transaction.

21. The system as set forth in claim 20 further comprising determining if the second system is authorized to retrieve the vistas responsive to the first request, wherein only the responsive and authorized vistas are transmitted from the first system to the second system in the single transaction.

22. The system as set forth in claim 20 wherein the first processor is configured to dynamically designate the panel of data in each of the vistas which is displayed in the collapsed state and to dynamically designate which of the panels of data in each of the vistas are in the more than one, but less than all of the panels of data for the open state in response to the first request.

23. The medium as set forth in claim 9 wherein retrieving at least two vistas from a memory comprises:

transmitting a first request for data from a first system to a second system; and determining which of the vistas in the memory are responsive to the first request; and transmitting all of the responsive vistas from the second system to the first system in a single transaction.

24. The system as set forth in claim 12 wherein the processor is further configured to:

receive a first request for data;

determine which of the vistas in the memory are responsive to the first request; and retrieve all of the responsive vistas from the memory in a single transaction.

25. The system as set forth in claim 16 wherein the first processor is further configured to:

receive a first request for data from the second system;

determine which of the vistas in the first memory are responsive to the first request; and transmit all of the responsive vistas from the second system to the first system in a single transaction.

* * * * *

UNITED STATES PATENT AND TRADEMARK OFFICE
CERTIFICATE OF CORRECTION

PATENT NO.     : 6,559,864 B1
DATED          : May 6, 2003
INVENTOR(S)    : Gregg R. Olin It is certified that error appears in the above-identified patent and that said Letters Patent is hereby corrected as shown below:

<u>Title page,</u>
Item [73], Assignee: "X-Net Associates, Inc." should be -- X/Net Associates, Inc. --.

Signed and Sealed this

Thirteenth Day of January, 2004

JON W. DUDAS
*Acting Director of the United States Patent and Trademark Office*